US009420539B2

(12) United States Patent
Lim

(10) Patent No.: US 9,420,539 B2
(45) Date of Patent: Aug. 16, 2016

(54) APPARATUS AND METHOD FOR CONTROLLING TRANSMISSION OF SENSOR DATA ON MEDIA ACCESS CONTROL (MAC) LAYER OF WIRELESS SENSOR NETWORK

(71) Applicant: Electronics and Telecommunications Research Institute, Daejeon (KR)

(72) Inventor: Sun-Hwa Lim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 139 days.

(21) Appl. No.: 14/249,812

(22) Filed: Apr. 10, 2014

(65) Prior Publication Data

US 2015/0173021 A1    Jun. 18, 2015

(30) Foreign Application Priority Data

Dec. 17, 2013  (KR) .......................... 10-2013-0157098

(51) Int. Cl.
*H04W 52/02* (2009.01)
*H04W 4/00* (2009.01)
*H04W 84/18* (2009.01)

(52) U.S. Cl.
CPC .......... *H04W 52/0241* (2013.01); *H04W 4/008* (2013.01); *H04W 84/18* (2013.01)

(58) Field of Classification Search
None
See application file for complete search history.

(56) References Cited

U.S. PATENT DOCUMENTS

| 2007/0070926 | A1* | 3/2007 | Bachl | H04L 1/0025 370/310 |
| 2007/0258508 | A1* | 11/2007 | Werb | H04W 84/18 375/140 |
| 2008/0070614 | A1* | 3/2008 | Ogushi | H04W 52/0216 455/522 |
| 2008/0250293 | A1* | 10/2008 | Taori | H04L 1/0082 714/748 |
| 2009/0067389 | A1* | 3/2009 | Lee | H04W 74/02 370/336 |
| 2009/0092049 | A1* | 4/2009 | Hargrave | H04L 12/66 370/235 |
| 2009/0207747 | A1 | 8/2009 | Kim et al. | |
| 2010/0082789 | A1* | 4/2010 | Kim | H04L 29/12216 709/223 |

(Continued)

FOREIGN PATENT DOCUMENTS

KR  1020090080691 A   7/2009
KR  1020100086339 A   7/2010

*Primary Examiner* — Chi H Pham
*Assistant Examiner* — Vladislav Agureyev
(74) *Attorney, Agent, or Firm* — William Park & Associates Ltd.

(57) ABSTRACT

A method for controlling transmission of sensor data by a coordinator of a wireless sensor network, the method including transmitting a data frame received from a sensor device to a PAN coordinator; in response to no acknowledgement message being received from the PAN coordinator during a predetermined period of time for waiting to receive an acknowledgement message, retransmitting the data frame; and, in response to a number of retransmission attempts of the data frame being exceeding a maximum number of retransmission attempts, transmitting Data Transmission Stop Notification to the sensor device in order to stop to receive any data frame from the sensor device.

9 Claims, 7 Drawing Sheets

(56) References Cited

U.S. PATENT DOCUMENTS

| | | | | |
|---|---|---|---|---|
| 2011/0004798 A1* | 1/2011 | Kim | H04L 1/1829 | 714/748 |
| 2011/0085442 A1* | 4/2011 | Lin | H04L 45/42 | 370/235 |
| 2011/0122933 A1* | 5/2011 | Adam | H04B 7/15592 | 375/219 |
| 2011/0216712 A1* | 9/2011 | Yang | H04L 1/0025 | 370/329 |
| 2012/0008545 A1* | 1/2012 | Zhang | H04L 1/1692 | 370/315 |
| 2012/0106349 A1* | 5/2012 | Adjakple | H04W 52/0206 | 370/241 |
| 2012/0155352 A1* | 6/2012 | Jeong | H04W 40/005 | 370/311 |
| 2013/0077558 A1* | 3/2013 | Ukita | H04W 16/26 | 370/315 |
| 2014/0122956 A1* | 5/2014 | Yun | H04L 1/1829 | 714/748 |
| 2014/0254471 A1* | 9/2014 | Fang | H04W 84/047 | 370/315 |

* cited by examiner

FIG. 4

| Command frame identifier | Command name | RFD | |
|---|---|---|---|
| | | T$_X$ | R$_X$ |
| 0x01 | Association request | X | |
| 0x02 | Association response | | X |
| 0x03 | Disassociation notification | X | X |
| 0x04 | Data request | X | |
| 0x05 | PAN ID conflict notification | X | |
| 0x06 | Orphan notification | X | |
| 0x07 | Beacon request | | |
| 0x08 | Coordinator realignment | | X |
| 0x09 | GTS request | | |
| 0x0a | Data Transmission stop notification | | X |
| 0x0b~0xff | Reserved | | |

401

APPARATUS AND METHOD FOR CONTROLLING TRANSMISSION OF SENSOR DATA ON MEDIA ACCESS CONTROL (MAC) LAYER OF WIRELESS SENSOR NETWORK

CROSS-REFERENCE TO RELATED APPLICATION(S)

This application claims the benefit under 35 U.S.C. §119 (a) of Korean Patent Application No. 10-2013-0157098, filed on Dec. 17, 2013, in the Korean Intellectual Property Office, the entire disclosure of which is incorporated herein by references for all purposes.

BACKGROUND

1. Field

The following description relates to a technology of wireless sensor communication, and, more particularly, to an apparatus and method for stopping data transmission when a coordinator, which is a superordinate layer of a sensor device, is in an orphaned state, thereby reducing unnecessary power consumption of the sensor device.

2. Description of the Related Art

IEEE 802.15.4, which is a standard protocol for low-power and low-rate wireless personal area networks (LR-WPANs), specifies a physical (PHY) layer and media access control (MAC) layer for the LR-WPANs. IEEE 802.15.4 is merely a packet data protocol for simple wireless networks, and supports a data rate of 250 kbp/s and star or peer-to-peer networks. In addition, IEEE 802.15.4 supports CSMA/CA algorithm for channel access and 64-bit identifiers/16-bit identifiers.

In a wireless sensor network based on the IEEE 802.15.4 standard, a Personal Area Network (PAN) coordinator is in charge of the whole network which is formed by connecting a plurality of sensor devices or coordinators. A coordinator may be a plurality of sensor devices or a plurality of different coordinators.

A sensor device transmits sensing data, that is, data, through an intermediate coordinator to a PAN coordinator, that is, a final destination. The sensor data periodically transmits data to the coordinator, and receives acknowledgement from the coordinator in response to the receipt of the data. In the case where the coordinator does not receive acknowledgement from the PAN coordinator after transmission of data, the coordinator determines itself to be in an orphaned state, and thus, performs an orphan scan. Regardless whether the orphan scan is performed between the coordinator and the PAN coordinator, the sensor device keeps transmitting data to the coordinator, because the sensor device is not informed of anything about the orphan scan. During the orphan scan, the coordinator receives data in a PHY layer thereof, but throws out the received data. Thus, the coordinator does not transmit acknowledgement to the sensor data in response to the data transmitted from the sensor device. The sensor device retransmits the data to the coordinator for up to a maximum number of retransmission attempts, and if it eventually fails to receive the acknowledgment, the sensor device stops transmitting data.

In such a case, powers are unnecessarily wasted as the sensor device retransmits the data to the coordinator for up to a maximum number of retransmission attempts. In addition, powers are unnecessarily wasted as the coordinator received the data in the PHY layer thereof.

SUMMARY

The following description relates an apparatus and method by which a coordinator rapidly notifies a sensor device that the coordinator is not available to receive data from the sensor device any longer, thereby reducing power consumption resulted from data transmission of the sensor device.

In one general aspect, there is provided a method for controlling transmission of sensor data by a coordinator of a wireless sensor network, the method including: transmitting a data frame received from a sensor device to a PAN coordinator; in response to no acknowledgement message being received from the PAN coordinator during a predetermined period of time for waiting to receive an acknowledgement message, retransmitting the data frame; and in response to a number of retransmission attempts of the data frame being exceeding a maximum number of retransmission attempts, transmitting Data Transmission Stop Notification to the sensor device in order to stop to receive any data frame from the sensor device.

In another general aspect, there is provided an apparatus for controlling sensor data by a coordinator of a wireless sensor network, the apparatus including: a receiver configured to receive a data frame from a sensor device; a transmitter configured to transmit the received data frame to a PAN coordinator; a retransmitter configured to, in response to no acknowledgement message being received from the PAN coordinator for a predetermined period of time for waiting to receive an acknowledgement message, retransmit the data frame; and a transmission stop notifier configured to, in response to a number of retransmission attempts of the data frame being exceeding a maximum number of retransmission attempts, transmit Data Transmission Stop Notification to the sensor device in order to stop to receive any data frame from the sensor device.

Other features and aspects may be apparent from the following detailed description, the drawings, and the claims.

BRIEF DESCRIPTION OF THE DRAWINGS

FIG. 4 is a diagram illustrating "Data Transmission Stop Notification" according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
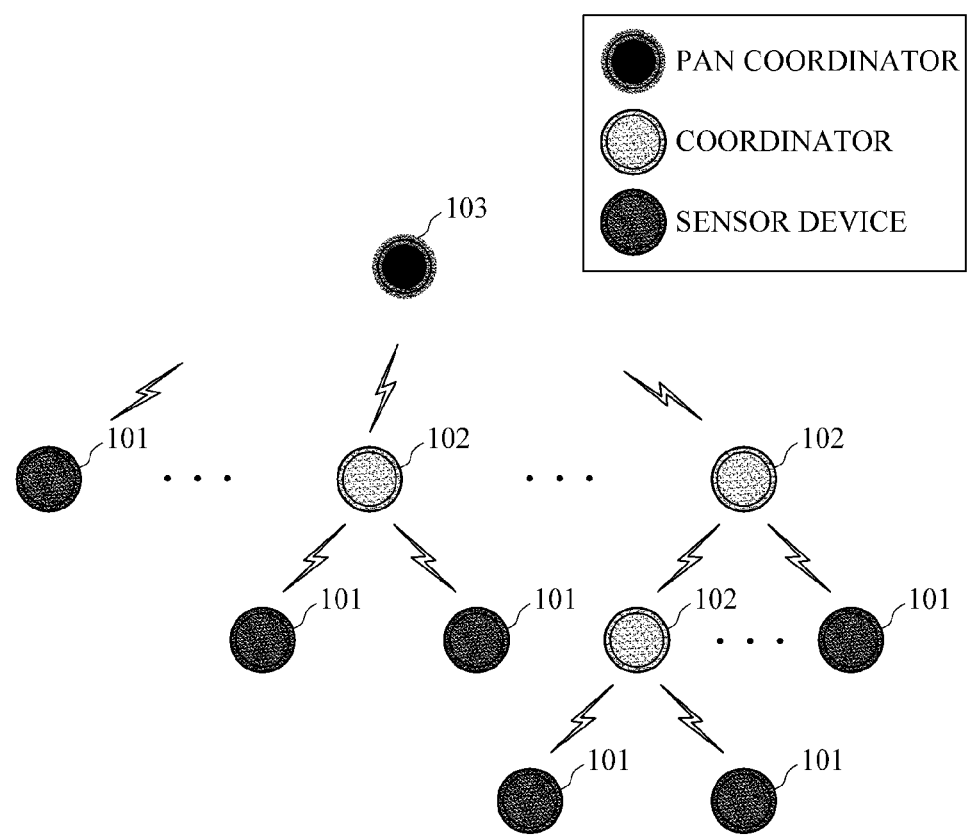
FIG. 1 is a diagram illustrating an example of a wireless sensor network in which an exemplary embodiment is applied.

FIG. 1 is a diagram illustrating an example of a wireless sensor network in which an exemplary embodiment is applied.

Referring to FIG. 1, each of sensor devices 101 transmits obtained sensor data to a coordinator 102 or to a PAN coordinator 103. Each of the coordinators 102 relays data received from the sensor device 101 or a subordinate coordinator. According to an exemplary embodiment, each of the coordinators 102 relays the data on a Media Access Control Sublayer (MAC) layer. The PAN coordinator 103 composes a Personal Area Network (PAN), and manages the sensor devices 101 and the coordinators 102 to processing data.

Figure 2:
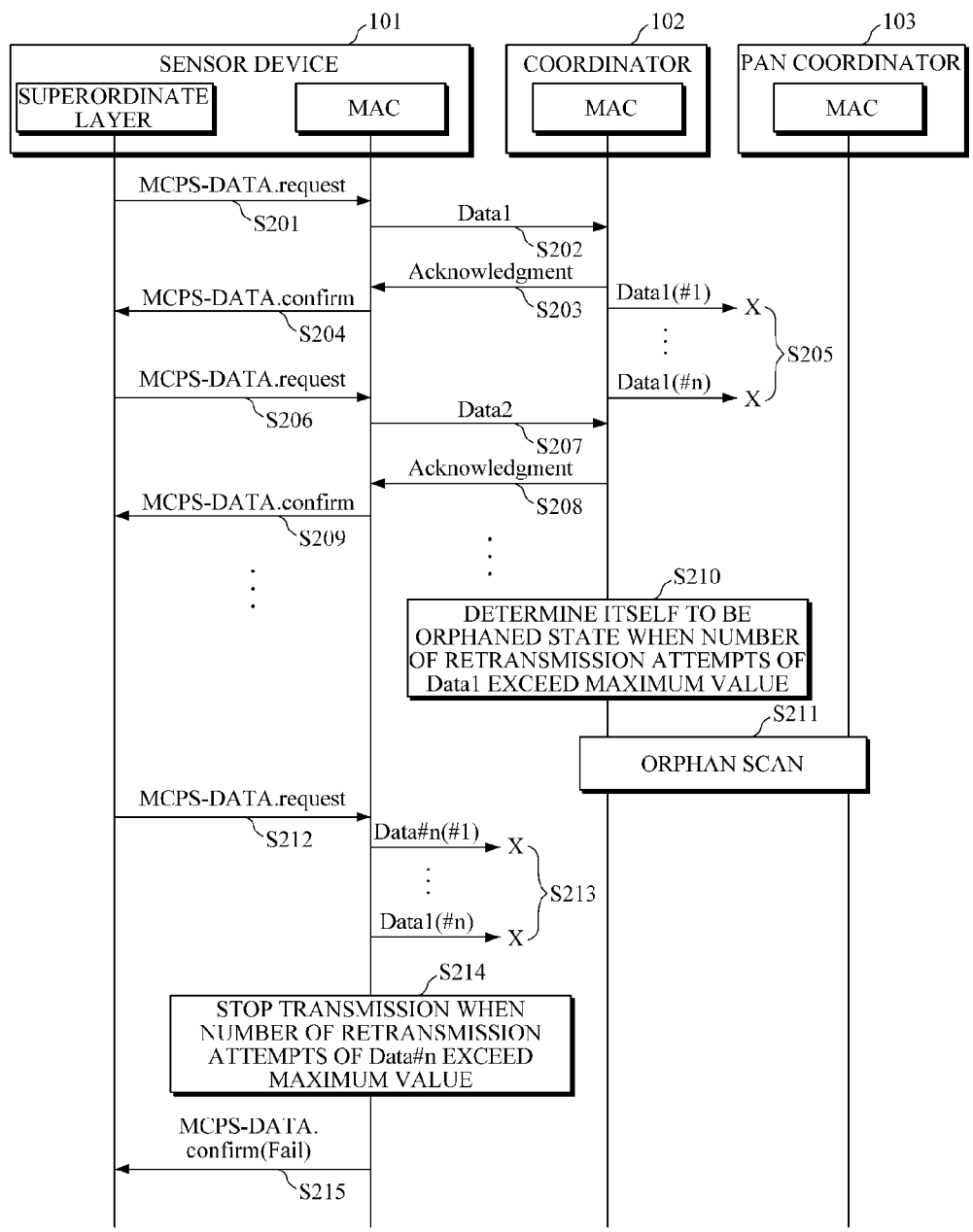
FIG. 2 is a flow chart illustrating a data transmission process specified in IEEE 802.15.4 standard.

FIG. 2 is a flow chart illustrating a data transmission processing specified in IEEE 802.15.4 standard.

Referring to FIG. 2, when having sensor data to be transmitted to the PAN coordinator 103, a superordinate layer of each sensor device 101, in operation S201, includes the sensor data and an address of the PAN coordinator 103, which is a destination, in "MAC CommonPartSublayer(MCPS)-DATA.request", and transmits the "MCPS-DATA request" to a MAC layer.

In addition, the MAC layer of the sensor device 101 transmits data of '1' to a MAC layer of the coordinator 102 in operation S202. After receiving of the data of '1', the MAC layer of the coordinator 102, in operation S203, transmits to the MAC layer of the sensor device 101 an acknowledgement message, represented as "Acknowledgement", which aims to notify the reception of the data of '1.'

In response to the Acknowledgement message, the MAC layer of the sensor device 101, in operation S204, transmits to the superordinate layer "MAC CommonPartSublayer (MCPS)-DATA.confirm" to notify successful transmission of the data of '1.' Then, the sensor device 101 periodically transmits data to the coordinator 102, and receives "Acknowledgement" from the coordinator 102 in response to receipt of the data in operation S206 to S209.

The coordinator 102 transmits the data '1' to the PAN coordinator 103 in operation S205. Then, the MAC layer of the PAN coordinator 103 receives a MAC frame of the data '1', and transmits "Acknowledgement" to the MAC layer of the coordinator 102 to notify receipt of the MAC layer of the data '1.' But the coordinator 102 does not receive "Acknowledgement" from the PAN coordinator 103, the coordinator 102 retransmits the data to the PAN coordinator 103.

In operation S210, the coordinator 102 determines whether the number of transmission attempts of the data '1' exceeds than a maximum number of retransmission attempts, and, if the number of transmission attempts of the data '1' exceeds the maximum number of retransmission attempts, the coordinator 102 determines itself to be in an orphaned state. In operation S211, the coordinator 102 performs an orphan scan.

The sensor device 101 is unable to notice whether an orphan scan is ongoing between the coordinator 102 and the PAN coordinator 103. Thus, the sensor device 101 continues transmitting data to the coordinator 102 as in operation S212 and S213. During the orphaned scan, the coordinator 102 receives data in a physical (PHY) layer of data during the orphan scan but throws out the received data, so that the coordinator 102 does not transmit "Acknowledgement" to the sensor device 101 to notify the receipt of the data. In this case, the sensor device 101 retransmits the data to the coordinator 102 for up to a maximum number of retransmission attempts in operation S213. If not receiving "Acknowledgement" from the coordinator 102 even after doing so, the sensor device 101 stops retransmitting the data to the coordinator 102. Then, in operation S215, the MAC layer of the sensor device 101 transmits to a superordinate layer of the sensor device 101 "MCPS-DATA.confirm" to notify transmission failure.

In this case, the sensor device 101 retransmits data to the coordinator 102 for up to a maximum number of retransmission attempts in operation S213, resulting in waste of power usage required for transmission. In addition, the PHY layer of the coordinator 102 receives data transmitted from the sensor device 101, resulting in waste of power consumption required for reception.

In order to solve the above drawback, the present disclosure provides an apparatus and method by which a coordinator is able to transmit a message for stopping data transmission to a sensor device immediately after detecting that the coordinator is in an orphaned state.

Figure 3:
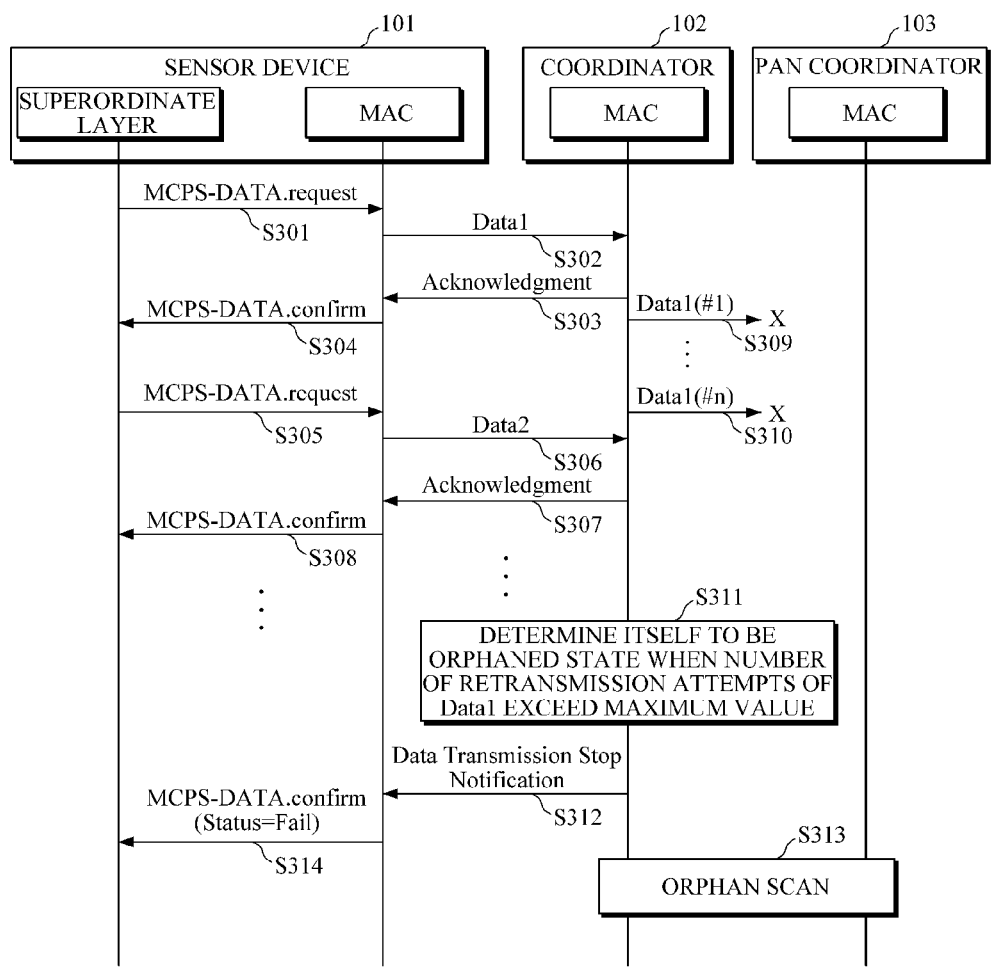
FIG. 3 is a flow chart illustrating a method for controlling transmission of sensor data on a Media Access Control Sublayer (MAC) layer of a wireless sensor network according to an exemplary embodiment.

FIG. 3 is a flow chart illustrating a method for controlling data transmission on a MAC layer of a wireless sensor network according to an exemplary embodiment.

Referring to FIG. 3, when having sensor data to be transmitted to the PAN coordinator 103, a superordinate layer of the sensor device 101, in operation S301, includes both sensor data and an address of the PAN coordinator 103, which is a destination, in "MAC CommonPartSublayer(MCPS)-DATA.request", and transmits the "MCPS-DATA.request" to a MAC layer of the sensor device 101.

Then, the MAC layer of the sensor device 101 transmits data '1' to a MAC layer of the coordinator 102 in operation S302. In response to receipt of the data '1', the MAC layer of the coordinator 102 transmits "Acknowledgement" to the MAC layer of the sensor device 101 to notify the receipt of the data '1' in operation S303.

In response to receipt of "Acknowledgement", the MAC layer of the sensor device 101 transmits "MCPS-DATA.confirm" to the subordinate layer of the sensor device 101 to notify successful transmission of the data '1' in operation S304. Then, in operation S305 to S308, the sensor device 101 periodically transmits the data to the coordinator 102 and receives from the coordinator 102 an acknowledgment message notifying receipt of the data.

In operation S309, the coordinator 102 transmits the data '1' to the PAN coordinator 103. In response to receipt of a MAC frame of the data '1', the MAC layer of the PAN coordinator 103 transmits "Acknowledgement" to the MAC layer of the coordinator 102 to notify receipt of the MAC frame of the data '1.' In the case where the coordinator 102 retransmits the data '1' to the PAN coordinator 103 but does not receive from the PAN coordinator 103 "Acknowledgement" that notifies receipt of the data '1', the coordinator 102 retransmits the data '1' to the PAN coordinator 103 in operation S310.

In operation S311, the coordinator 102 determines whether the number of retransmission attempts exceeds a maximum number of retransmission attempts, and, if so, determines itself to be in an orphaned state. According to an exemplary embodiment, the coordinator 102 transmits a message for stopping data transmission, the message which is represented as "Data Transmission Stop Notification", to the sensor device 101 in operation S312.

FIG. 4 is a diagram illustrating a "Data Transmission Stop Notification" according to an exemplary embodiment.

Referring to FIG. 4, 0x0a~0xff are being reserved in the IEEE 802.15.4 standard. Among the command names shown in FIG. 4, 0x0a is defined as "Data Transmission Stop Notification" 401.

Figure 5:
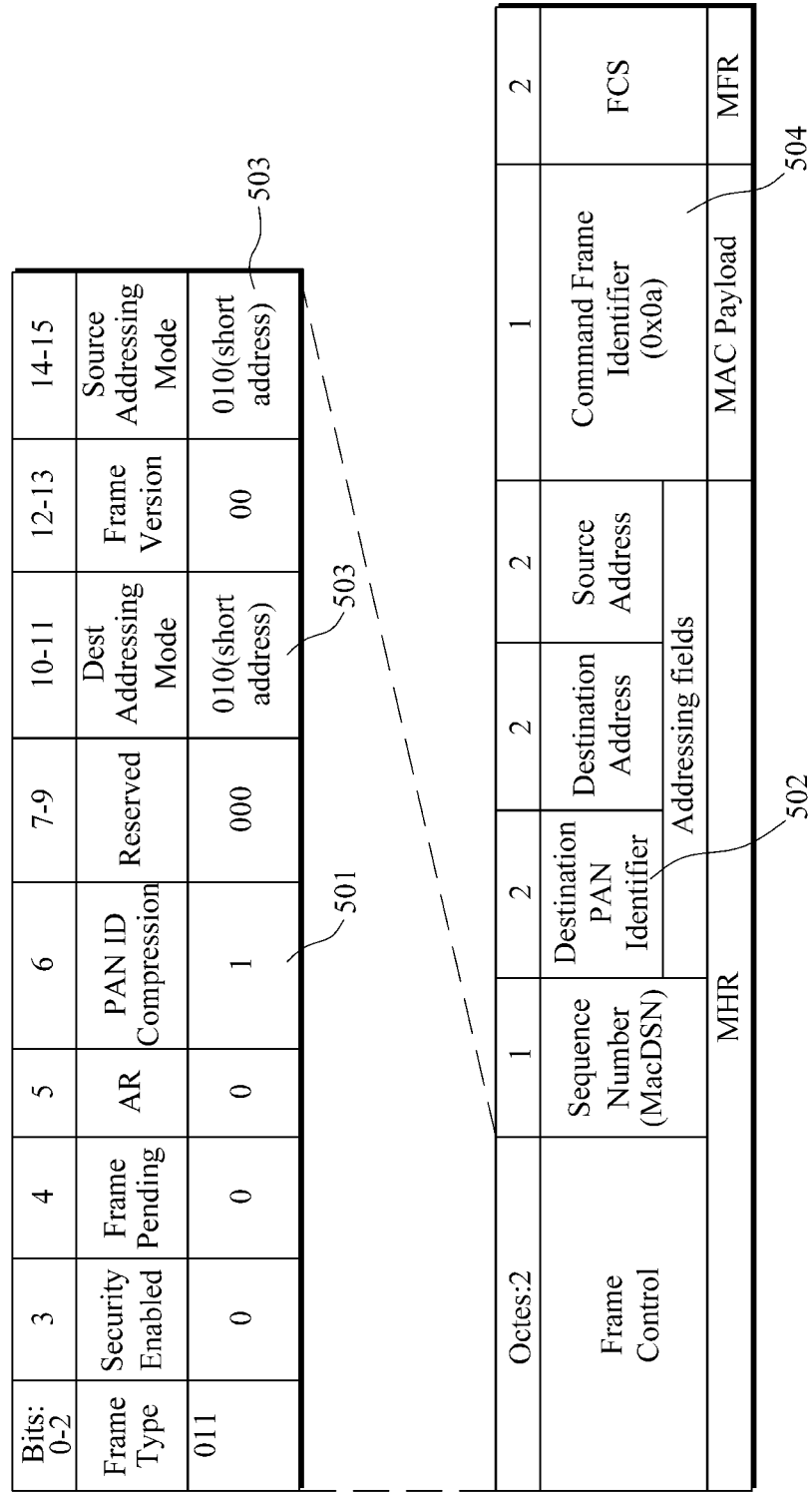
FIG. 5 is a MAC control frame format of the IEEE 802.15.4 standard for "Data Transmission Stop Notification" according to an exemplary embodiment.

FIG. 5 is a diagram illustrating a MAC control frame format of IEEE 802.15.4 for a "Data Transmission Stop Notification" according to an exemplary embodiment.

Referring to FIG. 5, in a PAN ID Compression field in a frame control of a MAC header is set as '1' in 501. In an addressing field of the MAC header includes only a destination PAN Identifier in 502. The frame control includes a Destination Addressing Mode, and a Source Addressing Mode includes a Short Address in 503. Command Frame Identifier of a MAC payload includes 0x0a in 504 that indicates "Data Transmission Stop Notification."

Again, referring to FIG. 3, the coordinator 102 processes an orphan scan in operation 313. Then, in operation 314, a MAC layer of the sensor device 101 transmits "MCPS-DATA.confirm" to a superordinate layer of the sensor device 101 to notify transmission failure.

Figure 6:
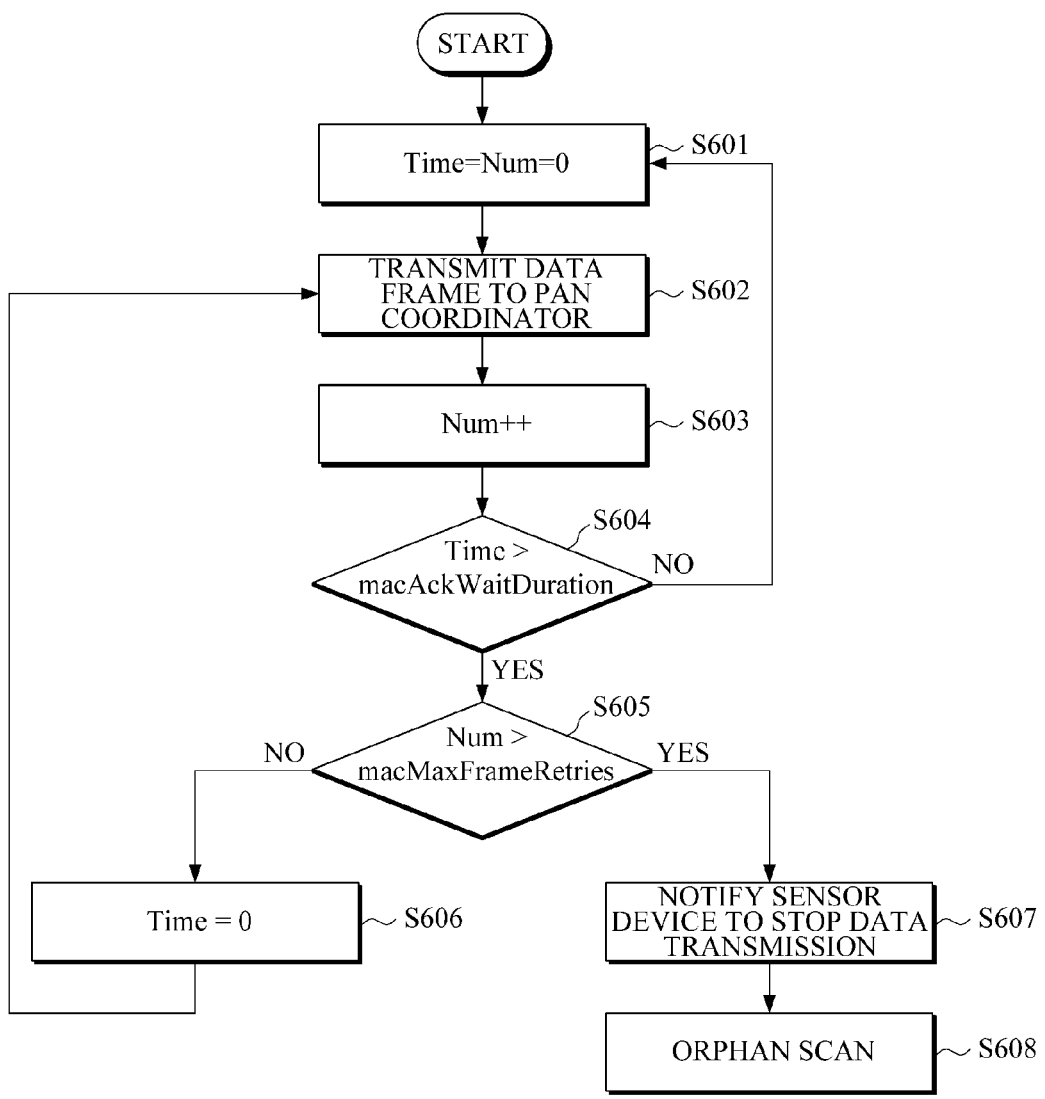
FIG. 6 is a flow chart illustrating a method for controlling data transmission on a MAC layer of a wireless sensor network according to an exemplary embodiment.

FIG. 6 is a flow chart illustrating a method for controlling data transmission on a MAC layer of a wireless sensor network according to an exemplary embodiment.

Referring to FIG. 6, after receiving a data frame from the sensor device 101, the coordinator 102 initializes, in operation S601, a value indicating time, which is represented as "Time", and the number of retransmission attempts the data frame, which is represented as "Num", of the received data frame to 0 before transmitting the data frame to the PAN coordinator 103. Then, the coordinator 102 transmits the data frame to the PAN coordinator 103 in operation S602, and increases the number of retransmission attempts in operation S603.

In operation S604, the coordinator 102 determines whether an acknowledgement message is received from the PAN coordinator 103 during a predetermined period of time for waiting to receive "Acknowledgement" from the PAN coordinator 103, the period of time which is represented as "macAckWaitDuration."

If it is determined in operation S604 that "Acknowledgement" is received from the PAN coordinator 103 during "macAckWaitDuration", the coordinator 102 proceeds with operation S601 to initialize "Time" and "Num" to 0 in order to transmit a new data frame the PAN coordinator 103.

If it is determined in operation S604 that "Acknowledgement" is not received from the PAN coordinator 103 during "macAckWaitDuration" and thus "Time" exceeds "macAckWaitDuration", the coordinator 102 determines in operation S605 whether "Num" exceeds a maximum number of retransmission attempts, which is represented as "macMaxFrameRetries."

If it is determined in operation S605 that "Num" does not exceed "macMaxFrameRetries", the coordinator 102 initializes "Time" to 0 in operation S606 in order to retransmit the data frame to the PAN coordinator 103.

Alternatively, if it is determined in operation S605 that "Num" exceeds "macMaxFrameRetries", the coordinator 102 transmits, in operation S607, "Data Transmission Stop Notification" to the sensor device 101 in order to stop to receive any data frame from the sensor device 101. In operation S608, the coordinator 102 performs an orphan scan.

Figure 7:
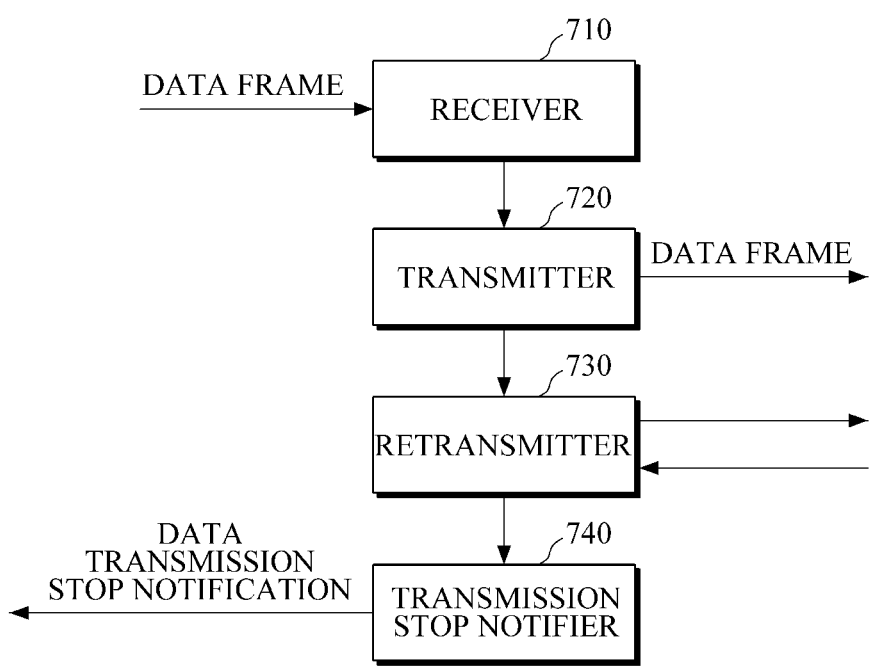
FIG. 7 is a diagram illustrating a configuration of an apparatus for controlling data transmission on a MAC layer of a wireless sensor network according to an exemplary embodiment.

FIG. 7 is a diagram illustrating a configuration of an apparatus for controlling data transmission on a MAC layer of a wireless sensor network according to an exemplary embodiment.

Referring to FIG. 7, an apparatus for controlling data transmission on a MAC layer of a wireless sensor network includes a receiver 710, a transmitter 720, a retransmitter 730 and a transmission stop notifier 740.

The receiver 710 receives a data frame from the sensor device 101, and the transmitter 720 transmits the received data frame to the PAN coordinator 103. At this point, the transmitter 720 initializes "Time" and "Num" of the data frame to 0 before transmitting the data frame to the PAN coordinator 103. Then, after transmitting the data frame to the PAN coordinator 103, the transmitter 720 increases "Num".

The transmitter 720 determines whether "Acknowledgement" is received from the PAN coordinator 103 during "macAckWaitDuration". It is determined that "Acknowledgement" is received from the PAN coordinator 103, the transmitter 720 initializes "Time" and "Num" to 0 in order to transmit a new data frame to the PAN coordinator 103. Alternatively, it is determined that "Acknowledgement" is not received from the PAN coordinator 103 and thus "Time" exceeds "macAckWaitDuration", the transmitter 720 notifies the retransmitter 730 of a result of the determination.

In the case where "Acknowledgement" is not received from the PAN coordinator 103 for a predetermined period of time, the retransmitter 730 retransmits the data frame to the PAN coordinator 103. At this point, the retransmitter 730 determines whether "Num" exceeds "macMacFrameRetries". If it is determined that "Num" does not exceed "macMacFrameRetries", the retransmitter 730 initializes "Time" to 0 and then retransmits the data frame to the PAN coordinator 103.

Alternatively, if "Num" exceeds "macMacFrameRetries", the retransmitter 730 notifies the transmission stop notifier 740 of a result of the determination.

The transmission stop notifier 740 transmits "Data Transmission Stop Notification" to the sensor device 101 in order to stop to receive any data frame from the sensor device 101. At this point, as illustrated in FIG. 5, the transmission stop notifier 740 includes "Data Transmission Stop Notification" in command frame identifier in a MAC payload. In addition, as illustrated in FIG. 4, "Data Transmission Stop Notification" is defined by 0x0a that is being reserved in the command frame identifier The present disclosure may rapidly notify a sensor device of an orphaned state of a coordinator on a wireless sensor network, and thus, may stop transmission of a data packet from a sensor device, thereby reducing unnecessary power consumption of the sensor device and unnecessary power consumption of the coordinator.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like.

Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like.

Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner. Also, functional programs, codes and code segments to implement those embodiments may be easily inferred by programmers who are skilled in the related art.

Those who are skilled in the related art may understand that various and specific modifications may be made without modifying the technical ideas or essential characteristics of the invention. Accordingly, the embodiments disclosed above are exemplary, and should be understandable not to be limited to in all aspects.

What is claimed is:

1. A method for controlling transmission of sensor data by a coordinator of a wireless sensor network, the method comprising:
   transmitting a data frame received from a sensor device to a PAN coordinator;
   in response to no acknowledgement message being received from the PAN coordinator during a period of time to receive an acknowledgement message, retransmitting the data frame; and
   in response to a number of retransmission attempts of the data frame exceeding a maximum number of retransmission attempts, transmitting a Data Transmission Stop Notification to the sensor device to stop receiving any further retransmission of the data frame from the sensor device.

2. The method of claim 1, wherein the transmitting of a data frame comprises:
   initializing a time and a number of retransmission attempts of the data frame; and
   after transmitting the data frame to the PAN coordinator, increasing the number of retransmission attempts.

3. The method of claim 1, further comprising:
   in response to an acknowledgement message being received from the PAN coordinator during the period of time, initializing the time and the number of retransmission attempts to transmit a new data frame to the PAN coordinator.

4. The method of claim 1, wherein the Data Transmission Stop Notification is included in a Command Frame Identifier in a MAC payload.

5. The method of claim 4, wherein the Data Transmission Stop Notification is defined by 0x0a that which is reserved in the Command Frame Identifier.

6. An apparatus for controlling sensor data by a coordinator of a wireless sensor network, the apparatus comprising:
   a receiver configured to receive a data frame from a sensor device;
   a transmitter configured to transmit the received data frame to a PAN coordinator;
   a retransmitter configured to, in response to no acknowledgement message being received from the PAN coordinator during a period of time to receive an acknowledgement message, retransmit the data frame; and
   a transmission stop notifier configured to, in response to a number of retransmission attempts of the data frame exceeding a maximum number of retransmission attempts, transmit a Data Transmission Stop Notification to the sensor device to stop receiving any further retransmission of the data frame from the sensor device.

7. The apparatus of claim 6, wherein the transmitter is further configured to initialize a value indicating a time and a number of retransmission attempts of the data frame, and after transmitting the data frame to the PAN coordinator, increasing the number of retransmission attempts.

8. The apparatus of claim 6, the transmission stop notifier is further configured to include the Data Transmission Stop Notification in a Command Frame Identifier in a MAC payload.

9. The apparatus of claim 8, wherein the Data Transmission Stop Notification message is defined by 0x0a which is reserved in the Command Frame Identifier.

* * * * *